United States Patent [19]
Serrano

[11] Patent Number: 6,034,835
[45] Date of Patent: Mar. 7, 2000

[54] MULTIPLE SERVO TRACK TYPES USING MULTIPLE FREQUENCY SERVO PATTERNS

[75] Inventor: Louis Joseph Serrano, San Jose, Calif.

[73] Assignee: International Business Machines Corporation, Armonk, N.Y.

[21] Appl. No.: 08/910,972

[22] Filed: Aug. 7, 1997

[51] Int. Cl.[7] .................................................. G11B 5/596
[52] U.S. Cl. .................................. 360/77.05; 360/77.08; 360/77.06; 360/75
[58] Field of Search ........................... 360/77.05, 77.08, 360/77.07, 77.02, 48, 133, 131, 135, 77.11, 78.14, 77.06

[56] References Cited

U.S. PATENT DOCUMENTS

| | | | |
|---|---|---|---|
| 5,602,692 | 2/1997 | Freitas et al. | 360/77.08 |
| 5,615,065 | 3/1997 | Cheung | 360/78.14 X |
| 5,818,659 | 10/1998 | Cheung et al. | 360/77.08 |

OTHER PUBLICATIONS

C.H. Bajorek, E. Harden and N.J. Mazzeo, "Large Surface Air Bearing for a Flexible Disc File", *IBM TDB*, vol. 18, No. 11, Apr. 1976, 3859–60.

M. Barlow, M.A. Church, R.E. Jones, Jr. and T.H. Yeh, "Thin Film Magnetic Head Assembly", *IBM TDB*, vol. 24, No. 4, Sep. 1981, 1912–13.

D.M. Jones. "Parallel Servo–Track Write and Read Verification with Side–By–Side Inductive Head Elements", *IBM TDB*, vol. 26, No. 8, Jan. 1984, 4243–44.

*Primary Examiner*—Muhammad Edun
*Attorney, Agent, or Firm*—Gray Cary Ware Freidenrich

[57] ABSTRACT

A magnetic disk storage system uses multiple-frequency position error sensing (PES) patterns and produces track identification information from the PES signal by detecting changes in relative servo pattern bursts of the multiple-frequency servo pattern. The number of tracks that can be identified with a multiple frequency, dual burst servo pattern is defined by each unique combination of servo pattern bursts. The system can provide accurate track-to-track position control even without gray code information, so long as timing marks or other orienting position information is available. A quad burst servo pattern is used for greater numbers of track types by selecting two dual burst patterns with different numbers of identified track types. The track types formed by such an arrangement consist of one track type from the first of the dual burst patterns and another track type from the second of the dual burst patterns, such that the total number of track types is the product of the number of track types from both dual burst patterns.

61 Claims, 10 Drawing Sheets

MULTIPLE SERVO TRACK TYPES USING MULTIPLE FREQUENCY SERVO PATTERNS

BACKGROUND OF THE INVENTION

1. Field of the Invention

This invention relates generally to magnetic head servo control systems and, more particularly, to disk drive position control systems that determine the location of a head relative to disk tracks.

2. Description of the Related Art

In a conventional computer data storage system having a rotating storage medium, such as a magnetic or magneto-optical disk system, data is stored in a series of concentric or spiral tracks across the surface of the disk. A magnetic disk, for example, can comprise a disk substrate having a surface on which a magnetic material is deposited. The digital data stored on a disk is represented as a series of variations in magnetic orientation of the disk magnetic material. The variations in magnetic orientation, generally comprising reversals of magnetic flux, represent binary digits of ones and zeroes that in turn represent data. The binary digits must be read from and recorded onto the disk surface in close proximity to the disk. That is, a read/write head can produce and detect variations in magnetic orientation of the magnetic material as the disk rotates relative to the head.

Conventionally, the read/write head is mounted on a disk arm that is moved across the disk by a servo. A disk drive servo control system controls movement of the disk arm across the surface of the disk to move the read/write head from data track to data track and, once over a selected track, to maintain the head in a path over the centerline of the selected track. Maintaining the head centered over a track facilitates accurate reading and recording of data in the track. Positioning read/write heads is one of the most critical aspects of recording and retrieving data in disk storage systems. With the very high track density of current disk drives, even the smallest head positioning error can potentially cause a loss of data that a disk drive customer wants to record or read. Accordingly, a great deal of effort is devoted to servo systems.

A servo control system generally maintains a read/write head in a position centered over a track by reading servo information recorded onto the disk surface. The servo information comprises a position-encoded servo pattern of high frequency magnetic flux transitions, generally flux reversals, that are pre-recorded in disk servo tracks. The flux transitions are recorded as periodic servo pattern bursts formed as parallel radial stripes in the servo tracks. When the read/write head passes over the servo pattern flux transitions, the head generates an analog signal whose repeating cyclic variations can be demodulated and decoded to indicate the position of the head over the disk. The demodulated servo signal is referred to as a position error sensing (PES) signal.

There are a variety of methods for providing servo track information to a disk servo control system. In a method referred to as the dedicated servo method, the entire surface of one side of a disk is pre-recorded with servo track information. A servo head is positioned over the dedicated servo disk surface in a fixed relationship relative to data read/write heads positioned over one or more other data disk surfaces. The position of the servo head relative to the dedicated disk surface is used to indicate the position of the multiple data read/write heads relative to their respective disk surfaces. The dedicated servo method is most often used with multiple disk systems in which a servo head of a single dedicated servo disk surface controls movement of corresponding data read/write heads of a multiple platter disk drive.

Another method of providing servo track information is known as the sector servo method. In the sector servo method, each disk surface includes servo track information and binary data recorded in concentric or spiral tracks. The tracks on a sector servo disk surface are partitioned by radial sectors having a short servo track information area followed by a data area. The servo track information area typically includes a sector marker, track identification data, and a servo burst pattern. The sector marker indicates to the data read/write head that servo information immediately follows in the track. The servo read head is typically the same head used for reading data.

In both the dedicated servo and sector servo types of systems, the PES signal is used to generate a corrective input signal that is applied to the read/write head positioning servo. The remaining description assumes the sector servo system, but the manner in which the servo control system could be applied to a dedicated servo system will be readily apparent to those skilled in the art.

FIG. 1 is a representation of servo track information pre-recorded into a track 20 of a conventional disk 22 for an exemplary servo sector and data field. An initial field in the track comprises a synchronization field 24, such as for automatic gain control (AGC) or similar signal detecting purposes. The next field in the track is a track identification field 26, typically comprising a digitally encoded gray code. Next is a PES pattern field 28, generally containing a servo pattern burst, as described above. The next field in the track is a customer data synchronization field 30, for permitting read circuitry to adjust to the data amplitude and frequency, which may differ from those of the servo information. The data synchronization field 30 is followed by a customer data field 32.

The track identification field 26 permits an unambiguous numerical identification for data tracks. It provides a coarse track indication for a single track, and the servo pattern provides more precise positioning information within a single track. Because track identifier information identifies a single track, it must be capable of being read from track to track as the servo head is moved across the disk in a track seek operation. Therefore, the magnetic transitions making up the track identification are typically radially aligned with each other. The range of a track identifier (one track) is smaller than the distance over which the servo pattern repeats, so that there is some redundancy in identifying a track. That is, a track will have an identifiable servo pattern as well as an assigned track identifier. This redundancy provides a more robust track identification scheme to resolve the least significant bit (LSB) of the gray code. This permits head position to be determined even if there is noise in the demodulated PES signal or other difficulty in position determination.

FIG. 2 is a representation of a conventional disk drive quad-burst servo pattern in which magnetic transitions are recorded on the disk surface in bursts labeled as A, B, C, and D. The servo pattern bursts move relative to a disk drive magnetic head (not illustrated) from right to left. The disk data tracks and half-track positions are indicated by the track numbers along the left side of the FIG. 2 drawing. The portion of the disk 22 shown in FIG. 2 extends approximately from track N−1.0 toward the inner diameter of the disk half-track position N+2.5 toward the outer diameter. Those skilled in the art will appreciate that position information is decoded by demodulating the signal generated by the head passing over the PES burst patterns to form a primary signal P based on:

$$P = A - C$$

and to form a quadrature signal Q based on:

$$Q = B - D.$$

The signals P and Q are quadrature signals because they are cyclic and are out of phase by 90 degrees (one-quarter phase). The magnetic transitions that comprise the servo pattern are represented in FIG. 2 by vertical bars. The letter within each group of bars represents the PES burst recorded therein. One burst is distinguished from another by relative position in a track and relative position to the other bursts. Thus, for a read head that can detect magnetic transitions from more than one track at a time, the signal P should be zero when tracking exactly along the centerline of track N, because the head will detect equal amounts of magnetic field from the A and C servo bursts. A similar situation exists for tracks N+1, N+2, and so forth for tracks that are an even number multiple of half tracks from N. For the half-track position N+0.5, the signal Q should be zero when tracking exactly along the N+0.5 half-track "centerline", because the head will detect equal amounts of field from the B and D servo bursts. The signal Q should be zero also for half-track positions N+1.5, N+2.5, and so forth.

To fit increasing amounts of customer data on disk storage systems, customer data transfer rates are increasing. This can necessitate increased servo data rates, because the servo channel and data channel often share filters. Increased servo data rates make it more difficult to align gray codes from track to track, which increases the incidence of misreading the gray code. These gray code misread errors can cause disk seek errors and errors in reading and writing data, if severe enough. A further advantage of increasing the servo data rate is that the gray code then requires less disk surface area than before, so more of the disk track area can be used for customer data.

From the discussion above, it should be apparent that there is a need for a disk drive system with a track identification scheme that can identify many thousands of tracks on a disk without requiring a gray code. The present invention fulfills this need.

SUMMARY OF THE INVENTION

The present invention uses multiple-frequency servo patterns and provides track identification information from the head readback signal to produce a position error sensing (PES) signal by detecting track types from servo pattern bursts themselves. A "track type" comprises a disk surface region where a particular combination of servo pattern bursts are used to derive the PES signal. Each unique combination of servo pattern bursts defines a track type. The more track types there are in a servo pattern, the longer is the radial distance traveled by the disk head before the servo pattern repeats. With less repetition, there is greater tracking accuracy and less chance of erroneous disk track positioning. In this way, the present invention permits accurate position control even in the absence of conventional track identifier information. Position information, such as timing marks that indicate direction to the inside diameter (ID) and outside diameter (OD), can be provided for additional track identification accuracy and capacity, identifying upwards of 10,000 disk tracks. The problems inherent in conventional track identifier utilization, such as alignment problems and usage of disk surface area otherwise suitable for customer data, are eliminated. The present invention can be implemented with dual burst and quad burst servo patterns, using two or more frequencies for the respective servo pattern bursts.

In one aspect of the invention, careful arrangement of the servo bursts in a dual burst servo pattern permits a number of track types T defined by:

$$T = N^*[(N-1)2]^*(N^*2) = N^*(N-1)^*N,$$

where N is the number of frequencies with which the servo pattern is recorded. This permits, for example, a three-frequency, dual burst servo pattern to define eighteen track types.

In another aspect of the invention, a quad burst servo pattern is used for greater numbers of track types by selecting two dual burst patterns with different numbers of track types. The track types formed by such an arrangement consist of one track type from the first of the dual burst patterns and another track type from the second of the dual burst patterns, such that the total number of track types is the product of the number of track types from both dual burst patterns. In this way, two five-frequency dual burst servo patterns arranged as a quad burst servo pattern can yield almost ten thousand track types, making track identifier fields unnecessary for current disk storage systems.

Other features and advantages of the present invention should be apparent from the following description of the preferred embodiment, which illustrates, by way of example, the principles of the invention.

DESCRIPTION OF THE PREFERRED EMBODIMENTS

In the servo burst pattern diagrams of FIGS. 3 through 8, which are used to generate a position error sensing (PES) signal, disk tracks run side to side horizontally across the page and the servo pattern magnetic transitions are represented by fields of vertical bars with an upper case letter designating a recorded servo pattern burst. The data tracks are indicated by the track numbers and half-track positions along the left side of the respective drawing figures.

The present invention recognizes that "track types" can be defined to provide track identification that is based on the servo pattern alone and without regard to conventional track identifier fields ordinarily used to identify a specific track. More particularly, the values from decoding the PES signal can be examined and track identification can be achieved based on the relative polarity of the quadrature values and their relative magnitudes, but independent of their absolute values. In accordance with the invention, a track type is defined to be a region where a particular, unique combination of the servo pattern bursts are used to derive the PES signal. The present invention achieves greatest advantage in application with multiple frequency dual burst patterns and also with multiple frequency quad burst patterns, but also has application to single frequency, multiple-burst servo patterns.

DUAL FREQUENCY, DUAL BURST SERVO PATTERN

Figure 1:
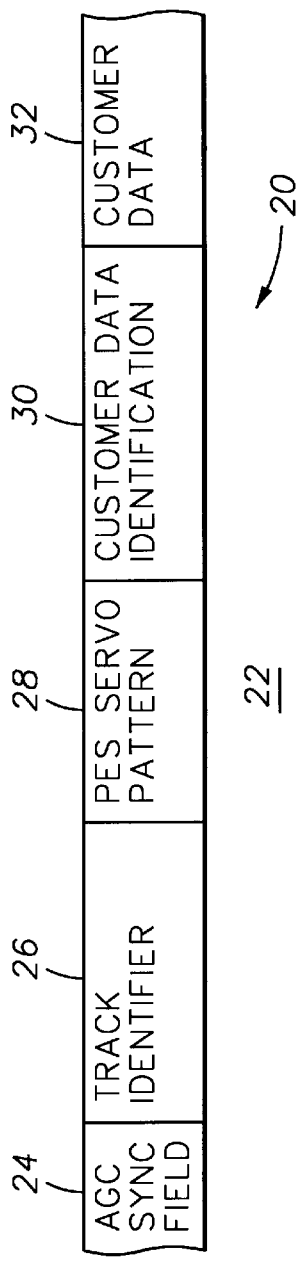
FIG. 1 is a representation of servo track information in a conventional sector servo disk.
Figure 2:
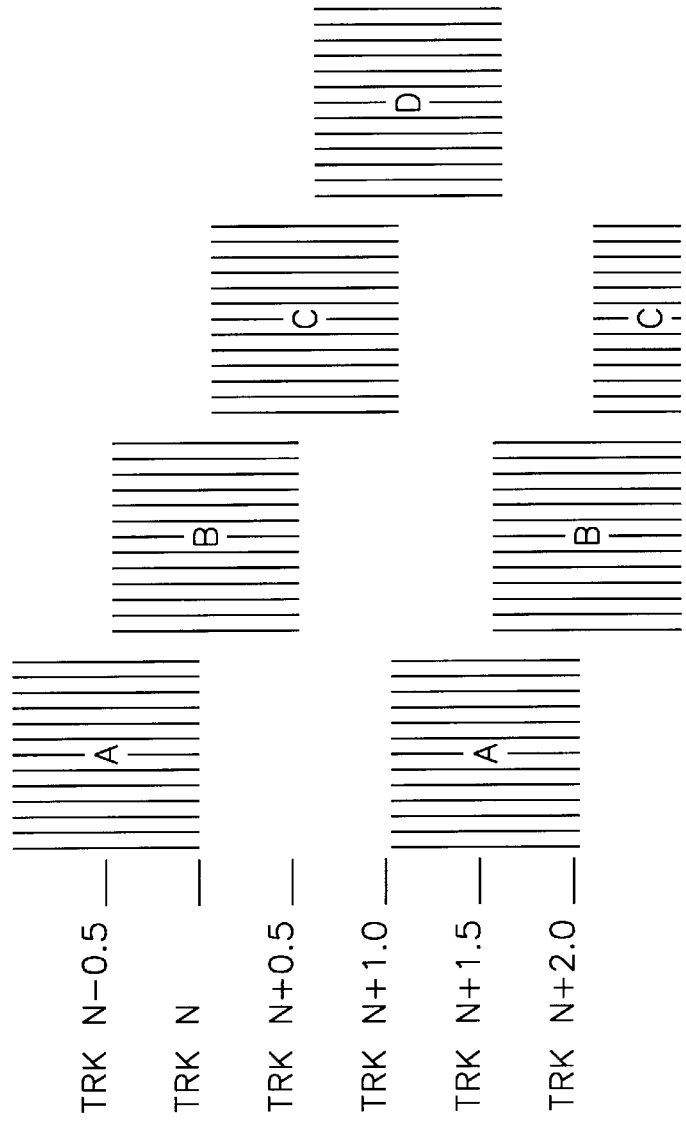
FIG. 2 is a representation of a conventional quad-burst servo pattern such as recorded into the sector servo disk of FIG. 1.
Figure 3:
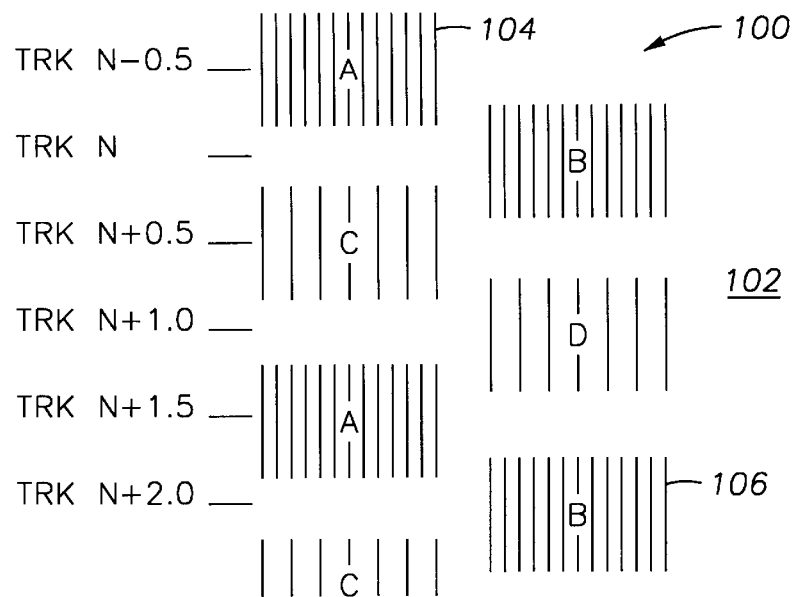
FIG. 3 is a representation of a two-frequency, dual burst servo pattern of a disk storage system constructed in accordance with the present invention.

FIG. 3 is a representation of a dual frequency, dual burst servo pattern 100 recorded in a servo sector on a disk surface 102 in accordance with the present invention. The magnetic transitions of the servo pattern are represented by vertical stripes having two different spacings. The two different vertical spacings of the transition stripes are meant to indicate that the respective transition stripe fields are recorded at different transition-to-transition frequencies. For example, burst A is recorded at a higher frequency than burst C. The pattern 100 is especially suited for narrow read heads, such as generally utilized in magneto-resistive (M-R) head design, and is described in greater detail in co-pending U.S. Patent Application entitled "Compact Servo pattern Optimized for M-R Heads," filed concurrently with this application. It should be understood that the portion of the pattern illustrated in FIG. 3 represents only a part of a servo sector of the disk. The top edge 104 of the servo pattern represents a portion of the disk that is located closer to the outside diameter of the disk relative to the rest of the servo pattern, and the portion illustrated extends approximately to the top of an "A" servo burst at disk track N−1.0 (not illustrated). The bottom edge 106 of the illustrated pattern 100 represents a portion of the disk 102 that is closer to the inside diameter of the disk and extends into a portion of the "C" servo burst, as shown.

The transition stripes in the fields A and C are parallel to indicate that the A and C transitions are in radial alignment. That is, the beginning and end of each A field and C field are on the same radial line extending outwardly from the disk center, and the A frequency and C frequency are multiples of each other. A similar relationship holds for the B and D fields.

With the definition of track types given above, it can be observed that the FIG. 3 servo pattern defines four track types, comprising P (formed from the sum A-C), Q (formed from B-D), -P (formed from C-A), and -Q (formed from D-B). During the decoding of the readback signal from the read head, the disk servo signal processing incorporates examination of the P, Q, -P, and -Q values to determine which of the four track types are being identified at any given time.

Such signal processing comprises decoding of the position information by demodulating the readback signal produced from the servo burst patterns. The servo bursts produce read head "P" signals that are generated by transducing the A and C servo pattern burst fields and adding samples of the readback signal such that $$P = A - C$$

and $$-P = C - A,$$

and also is generated by transducing the B and D servo pattern burst fields to form quadrature signals "Q" from $$Q = B - D$$

and $$-Q = D - B.$$

The signals P and Q, and -P and -Q are quadrature signals because they are cyclic and are out of phase by 90 degrees (one-quarter phase). The magnetic transitions that comprise the servo pattern are represented in FIG. 3 by vertical bars. The letter within each group of bars represents the burst recorded therein.

Servo bursts are distinguished from another by relative position in a track and relative position to the other bursts. As noted above, the relative frequencies of the servo bursts are indicated by the spacing of the vertical bars. For example, servo bursts A and B have the same spacing and are of the same frequency, and servo bursts C and D have the same spacing are of the same frequency, different from the frequency of A and B. It should be noted that the relative spacing of the stripes does not necessarily indicate their respective recording frequency.

For a read head that can detect magnetic transitions from more than one track at a time, the signal P=A−C should be zero when tracking exactly along the centerline of track N, because the read head will receive equal amounts of magnetic field from the A and C servo bursts. A similar situation exists for tracks N+1, N+2, and so forth. For the half-track position N+0.5, the signal Q=B−D should be zero when tracking exactly along the N+0.5 half-track "centerline". The signal Q should be zero also for tracks N+1.5, N+2.5, and so forth.

THREE-FREQUENCY, DUAL BURST SERVO PATTERN

The dual frequency, dual burst pattern of FIG. 3 provides increased numbers of track types over a comparable single frequency dual burst pattern while eliminating the need for an additional track identifier field, thus increasing data capacity. Nevertheless, additional benefits can be gained by using a three-frequency, dual burst pattern, as will be described subsequently. Where the dual frequency, dual burst arrangement provided four track types, the following patterns using three frequencies provide more track types, as well as other advantages, without using greater disk surface area. Following are four examples of three-frequency, dual burst servo patterns, providing six, eight, twelve, and eighteen track types, respectively.

Six Track Types

Figure 4:
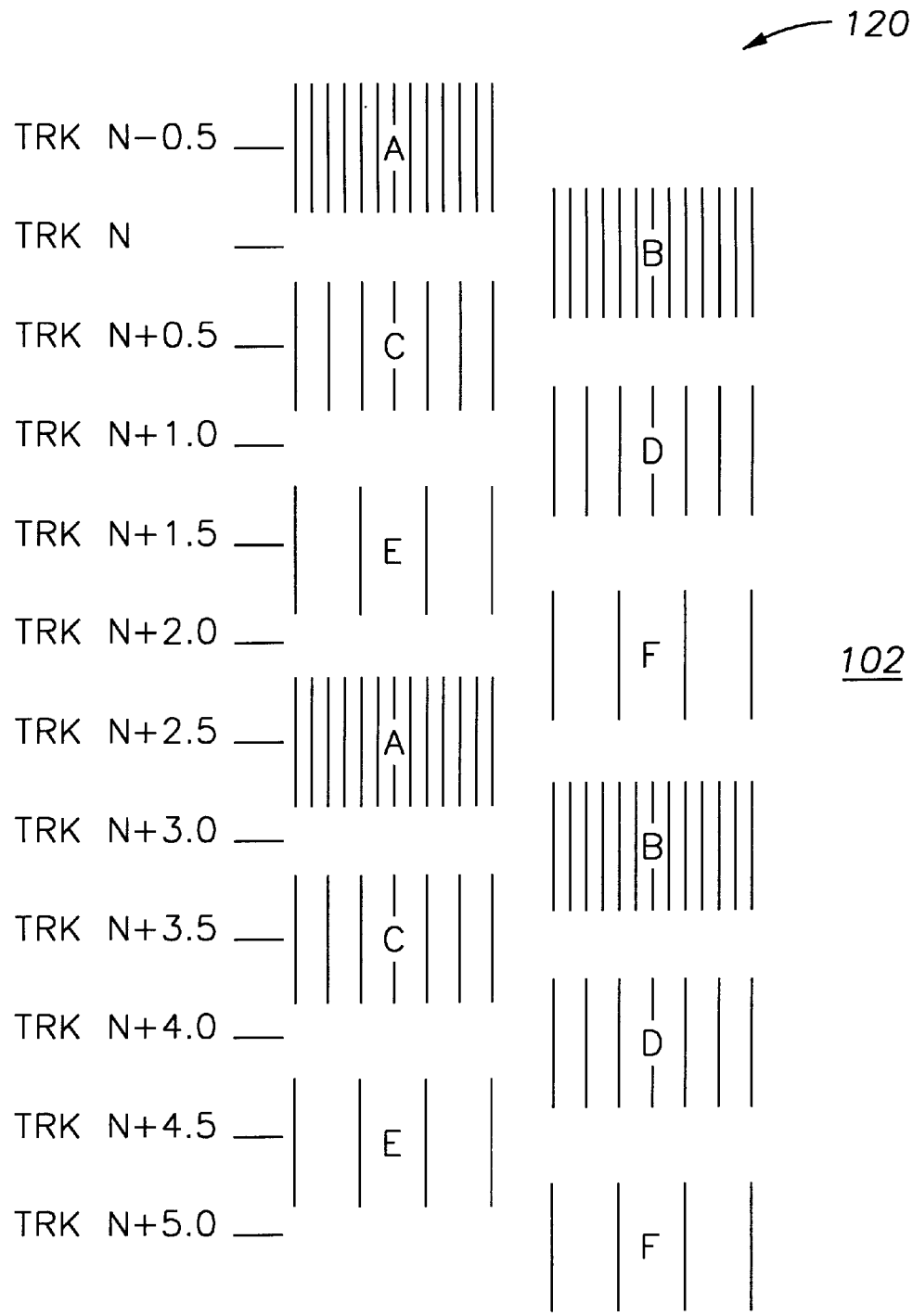
FIG. 4 is a representation of a three-frequency, dual burst servo pattern of a disk storage system constructed in accordance with the present invention that yields six track types.

FIG. 4 is a representation of a three-frequency, dual burst servo pattern 120 recorded in a servo track on a disk surface 102 in accordance with the present invention. Again, the frequencies of the servo pattern bursts are represented by the vertical bar spacing in the illustration. Thus, servo bursts A and B are of the same frequency, C and D are of the same frequency, and E and F are of the same frequency, all different from each other. The three different vertical spacings of the transitions are meant to indicate that the respective transition fields are recorded at different transition-to-transition frequencies, not to indicate their precise numerical relationship. The A, C and E burst are in radial alignment, as are the B, D, and F bursts. The three-frequency pattern of FIG. 4 shows that more than two frequencies in the servo pattern provide a greater disk radial distance before the servo pattern repeats and therefore provide a greater number of track types, as explained below.

The FIG. 4 pattern can be represented in text as follows:

```
AAccEEaaCCeeAA
BddFFbbDDffBBd
``` to illustrate that the P pattern consists of a repeating sequence of A, C, E, A, C, E, and then repeating again. In the text representation, alternating pattern fields are upper case and lower case for easier reading, not to indicate any change in content. Similarly, the Q pattern consists of a repeating sequence of B, D, F, B, D, F, and then repeating again, out of phase with the P pattern by a quarter phase.

The number of characters that are used to represent each servo pattern burst are not meant to indicate relative size between tracks. Rather, characters are used to conveniently indicate that the in-phase servo signals (the P terms) are out of phase with the quadrature servo signals (Q terms) by one-quarter cycle. Note that the letters making up the A-C-E . . . pattern on the top line are offset from the B-D-F . . . pattern on the lower line by one letter, which is meant to indicate a one-quarter phase offset. In particular, with respect to track types, P is one of the arithmetic sums A-C, C-E, or E-A, and Q is either B-D, D-F, or F-B. This gives six track types. In this decode, the PES gets bigger as the readback head is moved toward the outside diameter (OD) of the disk, while the gray code gets smaller. This must be taken into account when stitching the position signal components.

Eight Track Types

Figure 5:
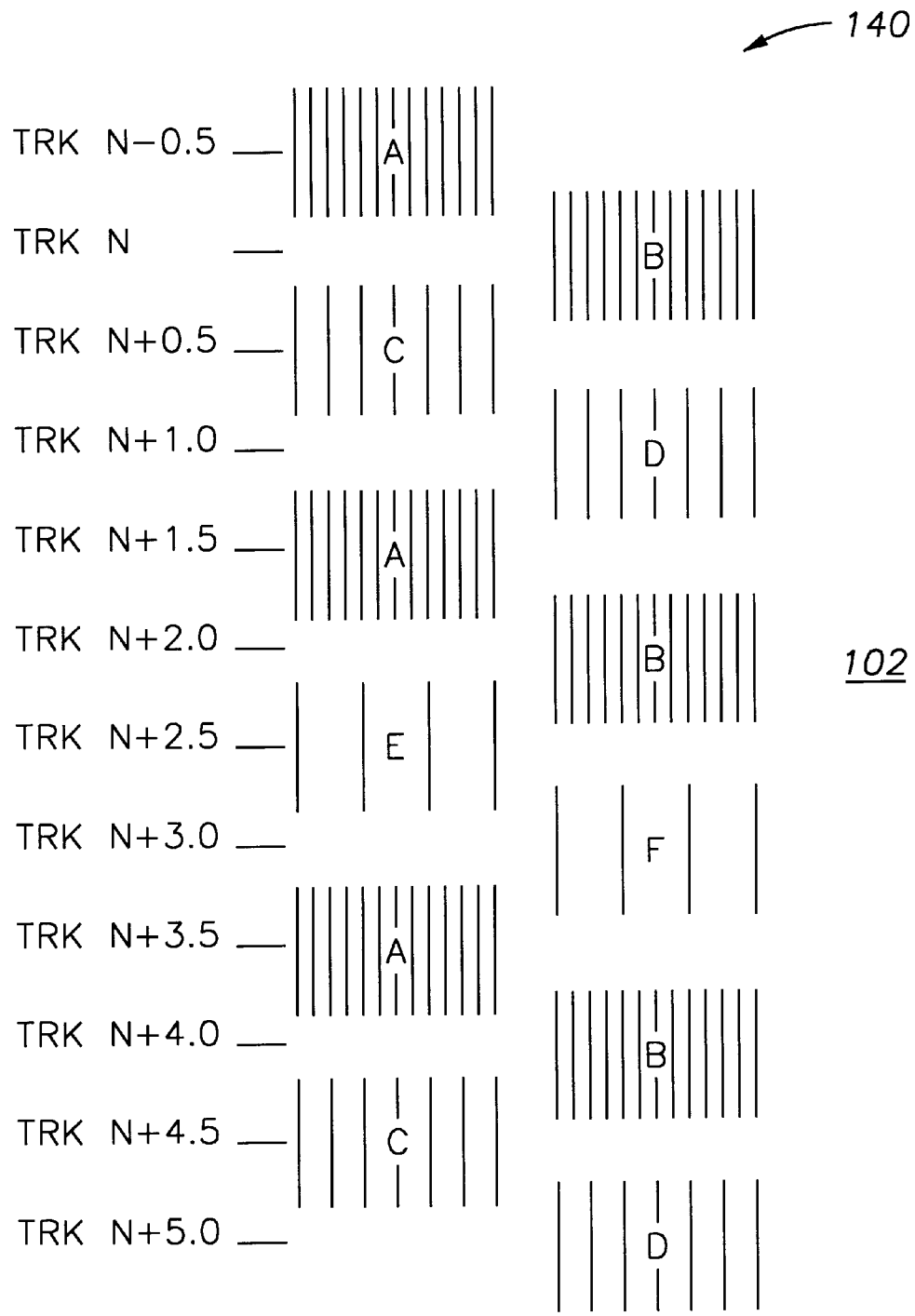
FIG. 5 is a representation of a three-frequency, dual burst servo pattern of a disk storage system constructed in accordance with the present invention that yields eight track types.

FIG. 5 is a representation of an alternative three-frequency, dual burst servo pattern 140 recorded in a servo track on a disk surface 102 in accordance with the present invention. As before, the frequencies of the servo pattern bursts are represented by the vertical bar spacing in the illustration. Again, servo bursts A and B are of the same frequency, C and D are of the same frequency, and E and F are of the same frequency, all different from each other. Also, bursts A, C, and E are in radial alignment, and bursts B, D, and F are in radial alignment. The three-frequency pattern of FIG. 5 shows that the three frequency pattern can be arranged to provide more than the six track types provided by the FIG. 4 pattern.

The FIG. 5 pattern can be represented in text as follows:

```
AAccAAeeAAccAAee
BddBBffBBddBBffB
``` to illustrate that the P pattern consists of a repeating sequence of A, C, A, E, A, C, A, E, and then repeating again. As with FIG. 4, alternating pattern fields in the text representation are upper case and lower case only for easier reading, not to indicate any change in content. Also, FIG. 5 shows that the Q pattern consists of a repeating sequence of B, D, B, F, B, D, B, F, and then repeating again. Thus, P is one of the arithmetic sums A-C, C-A, A-E, or E-A. Likewise, Q is one of either B-D, D-B, B-F, or F-B. This gives eight track types.

Twelve Track Types

Figure 6:
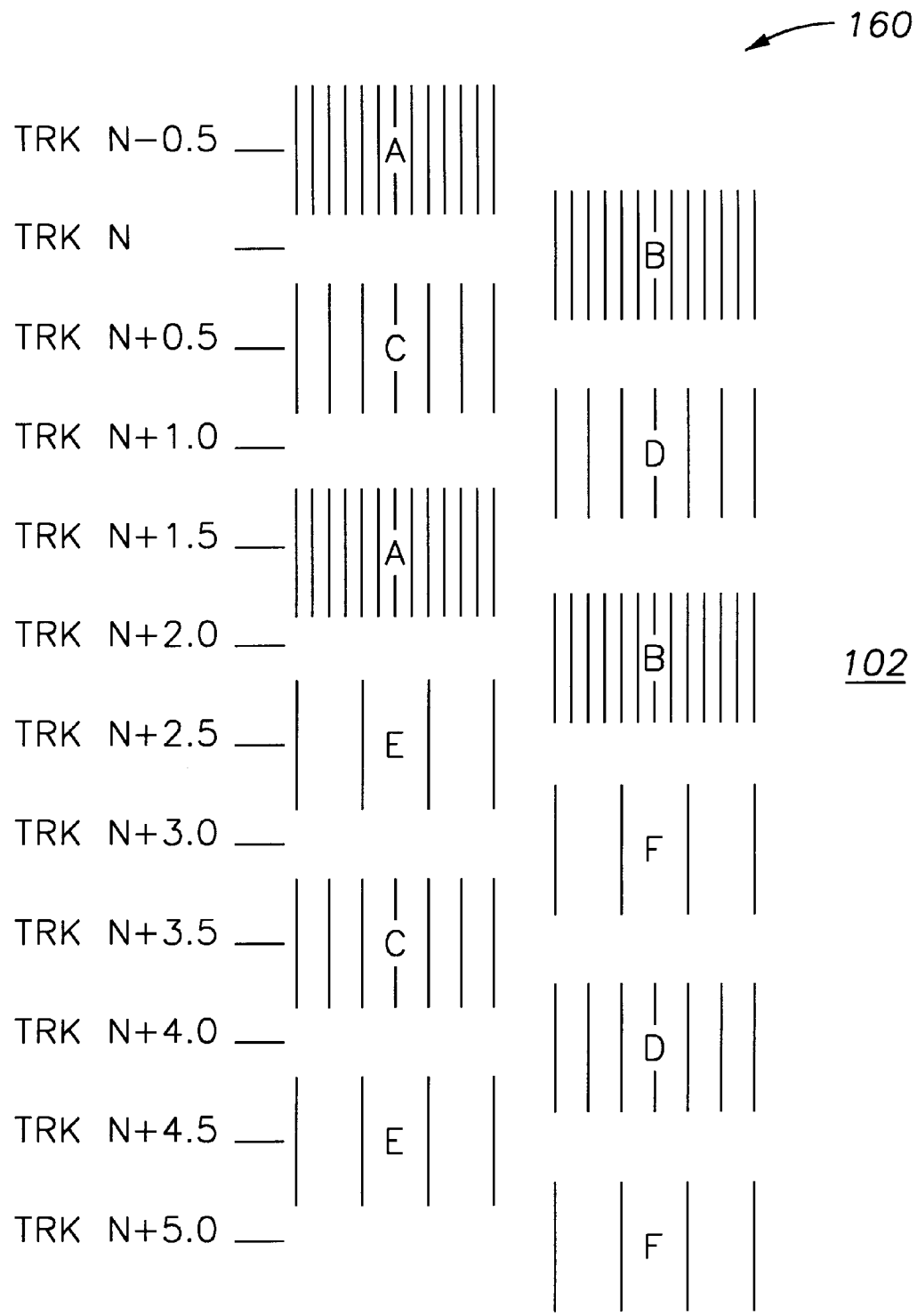
FIG. 6 is a representation of a three-frequency, dual burst servo pattern of a disk storage system constructed in accordance with the present invention that yields twelve track types.

FIG. 6 shows yet another three-frequency, dual burst pattern, one that provides twelve track types. The three-frequency, dual burst servo pattern 160 illustrated in FIG. 6 is recorded in a servo track on a disk surface 102 in accordance with the present invention. Once again, the frequencies of the servo pattern bursts are represented by the vertical bar spacing so that servo bursts A and B are of the same frequency, C and D are of the same frequency, and E and F are of the same frequency, and are all different from each other. Bursts A, C, and E are in radial alignment, as are bursts B, D, and F. The three-frequency pattern of FIG. 6 shows an arrangement of the PES servo bursts that provide twelve track types, and can be represented in text as follows:

```
AAccAAeeCCeeAA
BddBBffDDffBBd
``` to illustrate that the P pattern consists of a sequence of A, C, A, E, C, and E bursts, which then repeat again. Also, FIG. 6 shows that the Q pattern consists of a sequence of B, D, B, F, D, and F bursts, and repeats again. As with FIGS. 4 and 5, alternating pattern fields in the text representation are upper case and lower case only for easier reading, not to indicate any change in content. For the illustrated patterns, P is one of the arithmetic sums A-C, C-A, A-E, E-C, C-E, or E-A. Likewise, Q is either B-D, D-B, B-F, F-D, D-F, or F-B. This gives twelve track types for the FIG. 6 arrangement.

Eighteen Track Types

In general, the maximum number of track types for a dual burst PES quadrature servo pattern constructed from N frequencies is given by the number T, where:

$$T = N^*[(N-1)/2]^*(N)^*2 = N^*N^*(N-1).$$

The number T can be calculated with the combination of N frequencies selected two at a time for the P bursts, giving the $N^*(N-1)/2$ term, and each of these pairs can be matched to one of the N frequencies of the Q bursts, giving the additional N term, and then the same can be said of the Q bursts, hence the multiplication by 2.

One arrangement of the three frequency, dual burst servo pattern to obtain this theoretical maximum is shown in FIG.

7. It should be noted that the additional track types are produced because certain of the P and Q quadrature terms appear more than once in the sequence of decoded bursts. The repeating bursts are distinguished from each other by the relative sizes of the bursts in the corresponding quadrature (or in-phase) component.

Figure 7:
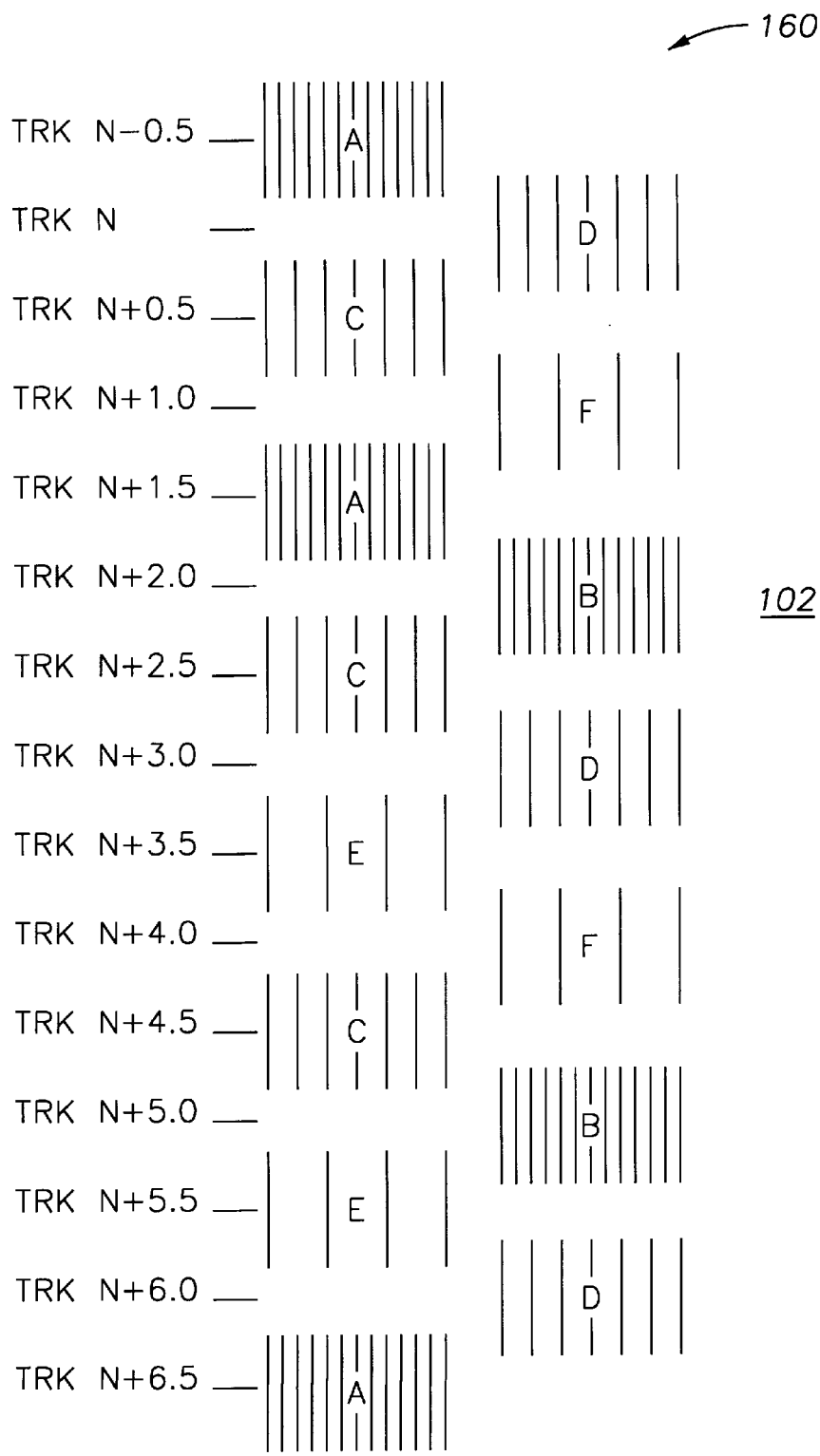
FIG. 7 is a representation of a three-frequency, dual burst servo pattern of a disk storage system constructed in accordance with the present invention that yields eighteen track types.

For example, the three-frequency, dual burst servo pattern 180 illustrated in FIG. 7 is recorded in a servo track on a disk surface 102 in accordance with the present invention. The frequencies of the servo pattern bursts are represented by the vertical bar spacing so that servo bursts A and B are of the same frequency, C and D are of the same frequency, and E and F are of the same frequency, and each of the pairings are different from the others. Bursts A, C, and E are in radial alignment, as are B, D, and F. The three-frequency pattern of FIG. 7 provides eighteen track types, and can be represented in text as follows:

```
AAccAAccEEccEEaaEE
bDDffBBddFFbbDDffB
``` to illustrate that the P pattern consists of a servo burst sequence of A, C, A, C, E, C, E, A, E, and then begins repeating. Also, FIG. 7 shows that the Q pattern consists of a servo burst sequence of B, D, F, B, D, F, B, D, F, and then begins repeating. As with FIGS. 4, 5, and 6, alternating pattern field letters in the text representation are upper case and lower case only for easier reading, not to indicate any change in content.

It may be noted that the term A-C appears twice within one servo pattern sequence of FIG. 7, once when D is the largest burst in the quadrature set (B, D, F) and once when B is the largest burst. In contrast, the term C-A appears only once in this exemplary pattern, when F is the largest burst in the quadrature set. More particularly, the P primary pattern pairings comprise A-C when the largest corresponding Q quadrature pattern is D, C-A when the corresponding quadrature is F, A-C with B, C-E with D, E-C with F, C-E with B, E-A with D, A-E with F, and E-A with B. Likewise, Q is either D-F with C, F-B with A, B-D with C, D-F with E, F-B with C, B-D with E, D-F with A, F-B with E, or B-D with A. This gives eighteen track types for the FIG. 7 arrangement.

Thus, increasing the number of PES servo burst frequencies beyond two has increased the number of track types by increasing the number of servo pattern pairs, and further increased track types permitting the same pair of servo pattern pairs to be distinguished by examination of the relative size of the burst values from the corresponding in-phase or quadrature (P or Q) signal.

MULTIPLE-FREQUENCY, QUAD BURST SERVO PATTERN

Figure 8:
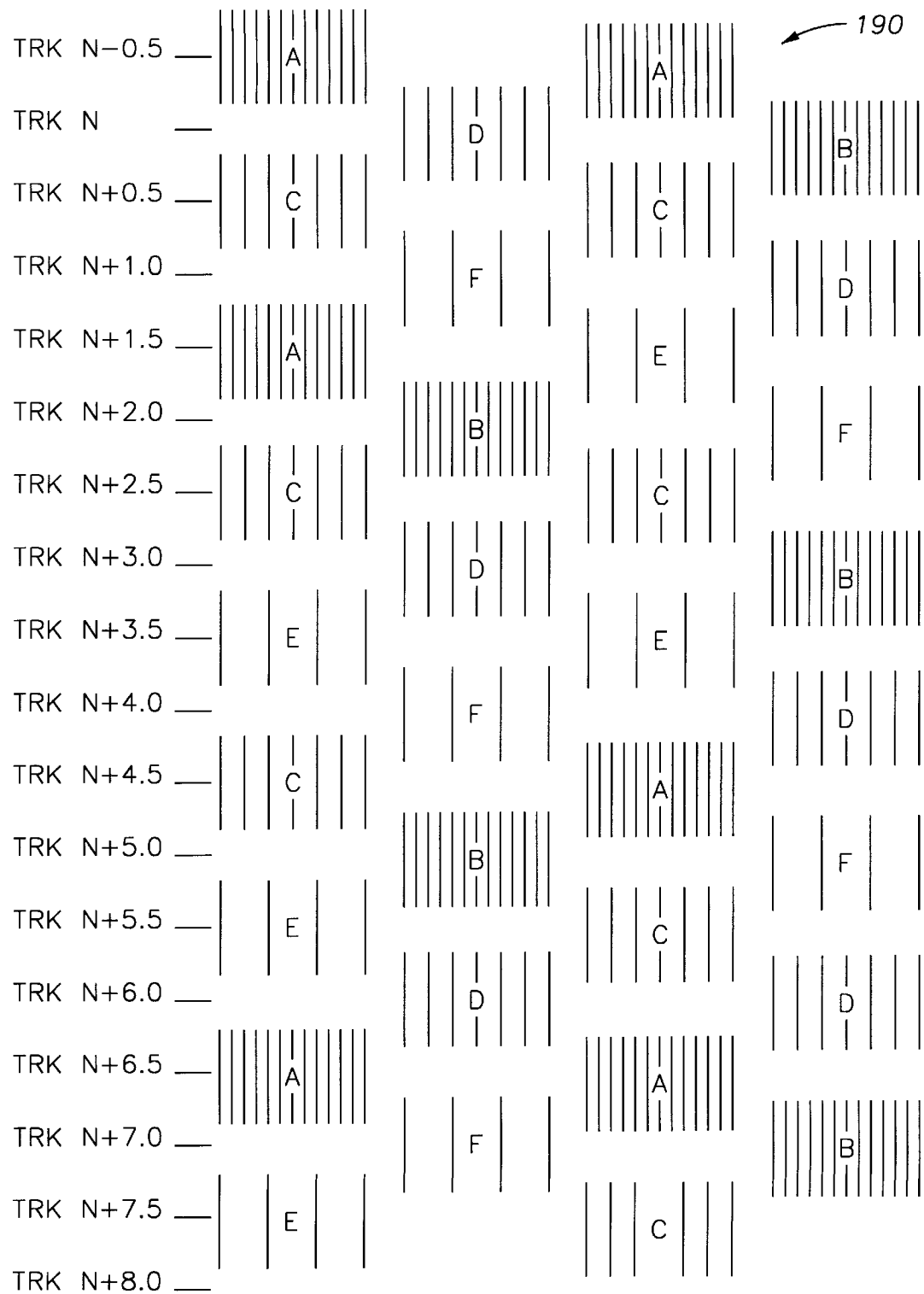
FIG. 8 is a representation of a three-frequency, quad burst servo pattern of a disk storage system constructed in accordance with the present invention that yields two hundred fifty-two track types.
Figure 9:
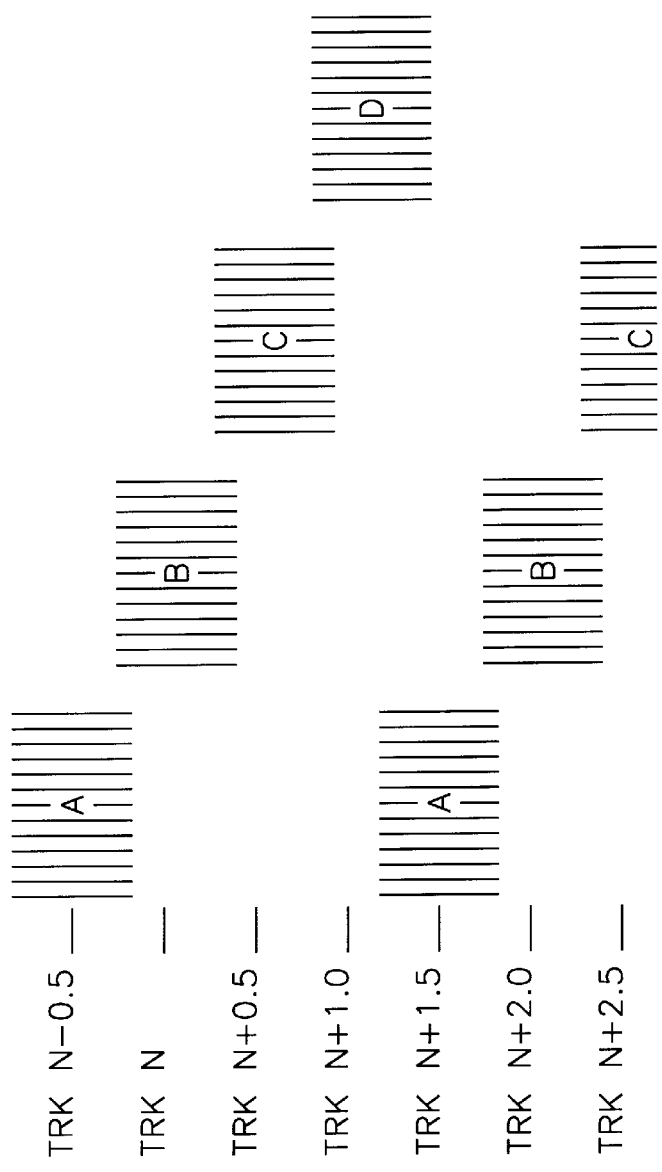
FIG. 9 is a representation of a single-frequency, quad burst servo pattern of a disk storage system constructed in accordance with the present invention that yields four track types.

The techniques implemented above in conjunction with the three-frequency dual burst servo patterns of FIGS. 4–7 can be extended to a multiple frequency, quad burst pattern. One such pattern 190 is shown in FIG. 8. When implementing a quad burst servo pattern with multiple frequencies in accordance with the present invention, two patterns are selected that repeat after a different number of bursts. The first two bursts of the quad pattern form a dual servo burst pattern complete unto itself. The second two bursts of the quad pattern do the same. Thus, an increase in track types is achieved by using two dual burst patterns with differing numbers of track types. The newly formed track types consist of one track type from the first pattern and one track type from the second pattern. In this scheme, the number of track types is the least common multiple (LCM) of the number of track types from each individual dual burst pattern.

Using the arrangement described above, a five-frequency, quad burst pattern can provide nearly ten thousand track types. This can be seen because a five frequency dual burst pattern can provide 100 track types, and a quad burst arrangement would call for two such patterns, and provide almost LCM (100, 100)=10,000 track types. It should be appreciated that this virtually eliminates the need for conventional gray code track identification information, as conventional disk drive systems typically contain no more than 5000 to 6000 customer data tracks. Any additional track identification information to provide completely unambiguous track identification can be provided by, for example, a timing mark in the PES field that identifies a track as being in a first half or second half of the disk, or that identifies an inner diameter side or outer diameter side track. In this way, a discrete gray code number is unnecessary and all track identification data is derived from information contained in the servo pattern field.

FIG. 8 is an example of the double dual-burst implementation of a quad burst described above, in which the two dual burst patterns include an eighteen-burst track type pattern and a fourteen-burst track type pattern. The eighteen-burst pattern might comprise the following arrangement:

```
AAccAAccEEccEEaaEE
bDDffBBddFFbbDDffB
```

As with all the other servo pattern text representations, alternating pattern fields are upper case and lower case for easier reading, not to indicate any change in content. The A, C, and E bursts are radially aligned and the B, D, and F bursts are radial aligned. The fourteen-burst servo pattern might comprise the following arrangement:

```
AAccEEccEEaaCC
BddFFbbDDbbFFb
```

Next, if the eighteen burst pattern and the fourteen burst pattern described above are arranged as a quad burst in accordance with the invention, then the period that will expire before the two patterns repeat again is given by the least common multiple of 18 and 14, which gives 126 tracks. Note that this is achieved using no more space radially on the disk than a conventional quad burst servo pattern.

TRACK INFORMATION

Figure 10:
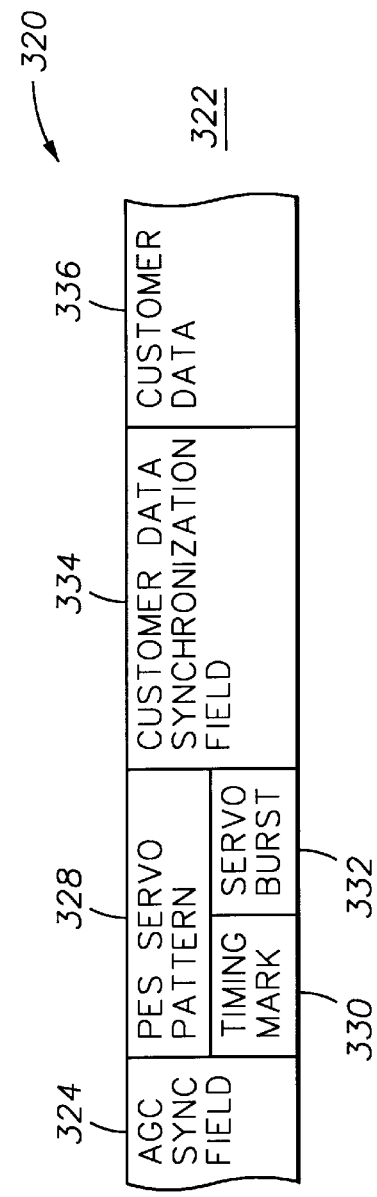
FIG. 10 is a representation of servo track information in a disk storage system constructed in accordance with the present invention.

As noted above, the ability of multiple frequency servo patterns, constructed in accordance with the invention, to unambiguously identify tracks, permits drastic reduction in gray code information needed, if not outright elimination of the gray code field. FIG. 10 is a representation of servo track information pre-recorded into a track 320 of a disk 322 constructed in accordance with the invention. An initial field in the track comprises a servo synchronization field 324, such as for automatic gain control (AGC) or similar signal detecting purposes. The next field in the track is a servo information field 328 containing an optional timing mark 330 and a multiple frequency servo pattern burst 332, such as described above in conjunction with FIGS. 3 through 9. The next field in the track is a customer data identification field 334, generally comprising a customer data synchronization pattern. The data identification field is followed by a customer data field 336.

It should be noted that there is no explicit gray code field in the track sector 320. If desired, track identification information such as a binary timing mark 330 can be recorded as part of the servo pattern field 328 to indicate a particular half or quadrant of the disk surface, as needed.

Thus, the gray code information can be discarded. This is advantageous because the gray code information must be carefully recorded so as to be in phase and readable during high speed seek operations, adding to the time and expense of disk manufacture and reducing the disk surface area otherwise available for customer data.

POSITION CONTROL SYSTEM

Figure 11:
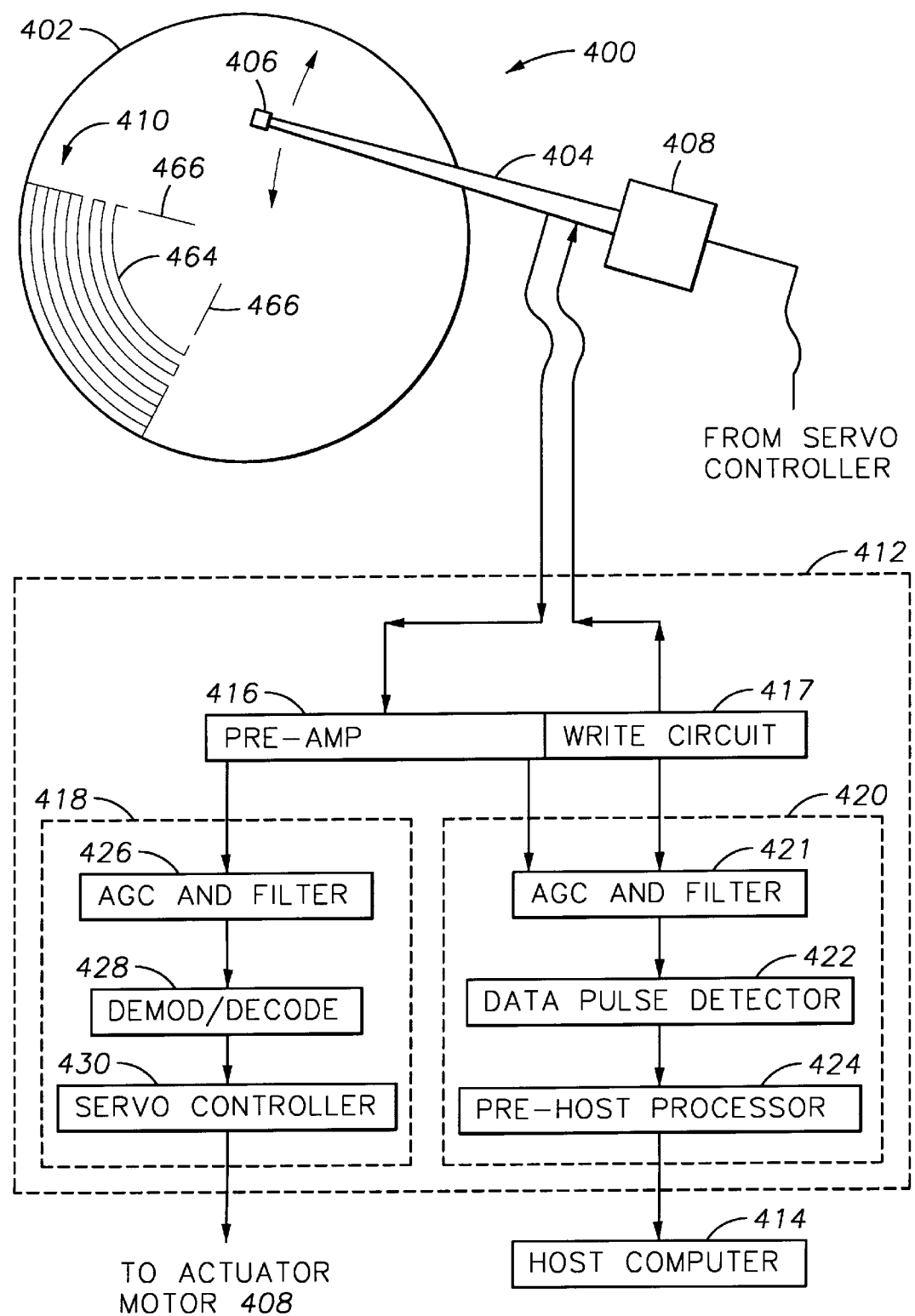
FIG. 11 is a block diagram of a disk storage system constructed in accordance with the present invention for position control using any of the servo patterns illustrated in FIGS. 3 through 8.

The track identification scheme of the present invention is generally implemented in conjunction with a magnetic disk drive 400, in an arrangement such as that depicted in FIG. 11. The disk drive 400 may include one or more individual disks 402 for storing magnetically encoded information. For ease of explanation, however, only one disk 402 is illustrated in FIG. 11. The disk drive 400 also includes an actuator 404 with a read/write head 406. The position of the actuator 404 is controlled by an actuator motor 408, which pivots the actuator, thereby changing the position of the read/write head 406 with respect to concentric tracks 410 of data contained on the disk 402. Although rotary movement of the actuator 404 is depicted for illustrative purposes, the disk drive 400 may alternatively use another positioning scheme, such as linear extension/retraction of the actuator 404.

The operation of the disk drive 400 is managed by a disk drive controller 412, which also serves as an interface between the disk drive 400 and a host computer 414. The host computer may comprise, for example, a desktop computer, a notebook computer, a mainframe computer, or another digital processing device for which storage of data on a disk is desired.

The controller 412 includes a readback signal pre-amplifier 416 ("pre-amp"), which receives electrical representations of servo patterns sensed by the read/write head 406 from the disk 402. With sector servo positioning, the pre-amp 416 preferably serves a dual purpose by amplifying either data or servo signals, depending on whether the read/write head 406 is positioned over stored customer data or servo patterns, respectively. A write circuit 417 is also provided to supply the read/write head 406 with data signals to be written to the disk 402. As an alternative to the sector servo arrangement illustrated in FIG. 11, the read/write head 406 may be used to sample servo signals from a dedicated servo surface. Although the present invention contemplates both sector servo and dedicated surface embodiments, the sector servo embodiment of the invention will be described herein for consistency and ease of explanation.

The amplified signal from the pre-amp 416 is directed to two processing channels: a servo channel 418 and a customer data channel 420. The write circuit 417 is connected only to the data channel. The data channel 420 generally reads and writes data to and from the disk 402, in response to requests from the host computer 414 to read or write the data. When operating in conjunction with the data channel, the pre-amp 416 amplifies signals provided by the read/write head 406 that correspond to customer data stored on the disk 402. Amplified data signals from the pre-amp are then directed to an automatic gain control and filter circuit 421. Then, a data pulse detector 422 forms digital data pulses corresponding to the analog signals provided by the circuit 421. Next, a pre-host processor 424 converts the data pulses into formatted data strings that are specifically compatible with the host computer 414. The components of the data channel 420 also operate in reverse order to write data to the disk 402.

In contrast to the data channel 420, the servo channel 418 generally functions to read servo data from the disk 402 to aid in properly positioning the read/write head 406. When operating in conjunction with the servo channel 418, the pre-amp 416 amplifies servo signals produced when the read/write head 106 senses servo patterns. The servo channel 418 includes an automatic gain control (AGC) and filter circuit 426, which may comprise any one of various known circuits for automatically adjusting the readback signal gain and filtering it. Next, a demodulator/decoder 428 receives the readback signal and processes the information to derive a position error sensing (PES) signal, which is related to the position of the read/write head 406 with respect to the desired track center and is indicative of the read/write head position error. The PES signal is then used by a servo controller 430 to generate an input signal that, when provided to the actuator 404, controls the position of the read/write head 406. The actuator motor 408 may, in an exemplary embodiment, comprise a voice coil motor.

The servo pattern is recorded into, and read from, tracks across the disk 418. In FIG. 11, circular, parallel lines 464 designate servo tracks of the disk, which is divided into sectors that are represented by radial lines 466. The servo tracks can include several repeated cycles of a servo pattern and can encompass one or more tracks of customer data. Each sector includes a servo information field 328 followed by a customer data identification field 334 and a customer data field 336. After the servo pattern has been recorded and disk production is complete, a user can record and read the user's customer data from the customer data field using, for example, the system illustrated in FIG. 11.

SERVO CHANNEL PROCESSING

The operation of the disk drive controller 412 described above is illustrated in the flow diagram of FIG. 12, which represents the operating steps performed by the disk drive controller in determining the track over which the read/write head 406 is positioned and in controlling its position. These steps are continuously performed whenever the disk drive is being operated in a track seek or track following mode.

In the first step of operation, represented by the flow diagram box numbered 502, the controller 412 receives the readback signal from the read/write head 406. Next, the controller determines the track type from the servo data contained in the readback signal. This step is represented by the flow diagram box numbered 504. As described above, the processing represented by the box 504 may comprise comparing the in-phase portion of the first portion of a dual burst servo pattern with the quadrature portion of the dual burst servo pattern. For example, the processing of box 504 in the case of the three frequency, eighteen burst pattern would include the steps of:

(a) receiving an A-C pattern burst (determined to be an A-C pattern conventionally, according to the value of the readback signal sample and the relative timing of the sample);

(b) determining that the sample corresponds to a first-type burst if the associated quadrature sample indicates that D is the largest size in the quadrature set of B, D, F; and (c) determining that the sample corresponds to a second-type burst otherwise.

Similar processing in the flow diagram box 504 that would be carried out for the remaining pattern bursts should be apparent to those skilled in the art, in view of the description given above.

After the controller determines the track type, the controller next determines the location of the read/write head based on the track type, as represented by the flow diagram box numbered 506. The controller can make this determination, for example, knowing the correspondence between the track type and the location of tracks corresponding to that track type on the surface of the disk. The angular position of the head can be determined relative to a timing mark recorded in the track or in relation to a dedicated clock track on the disk to thereby provide the precise location of the read/write head over the disk surface.

Figure 12:
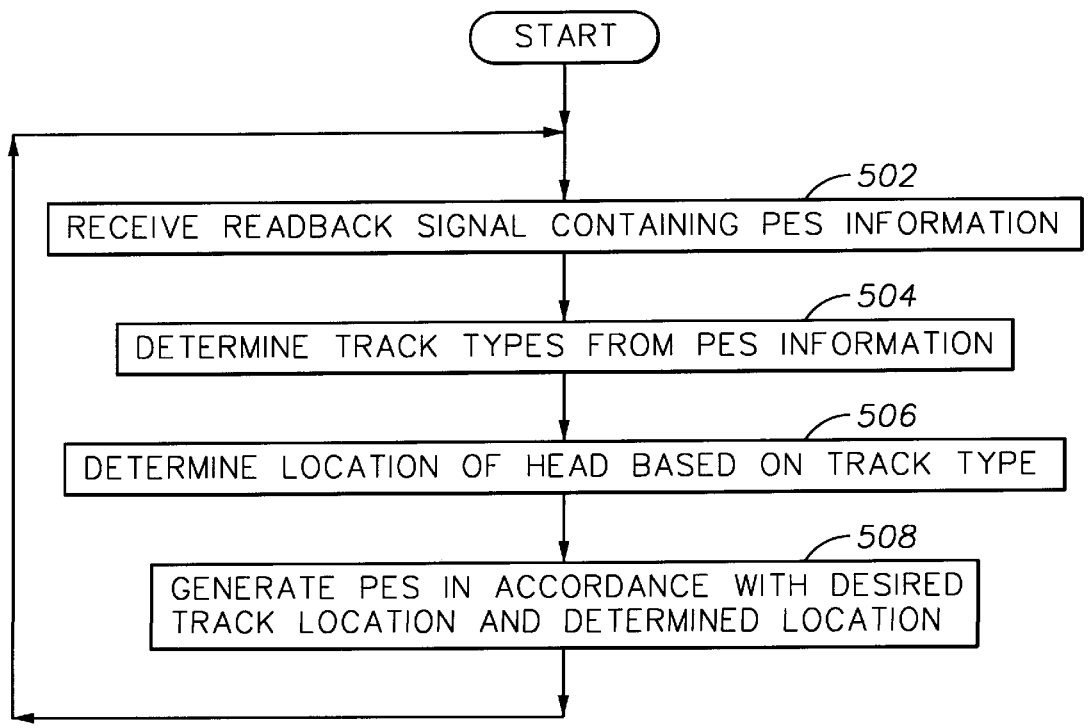
FIG. 12 is a flow diagram of the processing steps performed by the system illustrated in FIG. 10 in determining a track type.

In response to the determined head location, the controller lastly generates a PES signal that commands the head servo to move the read/write head in the direction indicated by the difference, if any, between the determined head location and the desired head location. The desired head location is obtained, for example, from a known destination track of a seek operation or from the known track for which a track following operation is desired. This step of position control is represented in FIG. 12 by the flow diagram box numbered 508. The processing then repeats with the processing of the flow diagram box 502, following the receipt of the next readback signal samples demodulated from the read/write head.

PATTERN RECORDING SYSTEM

Figure 13:
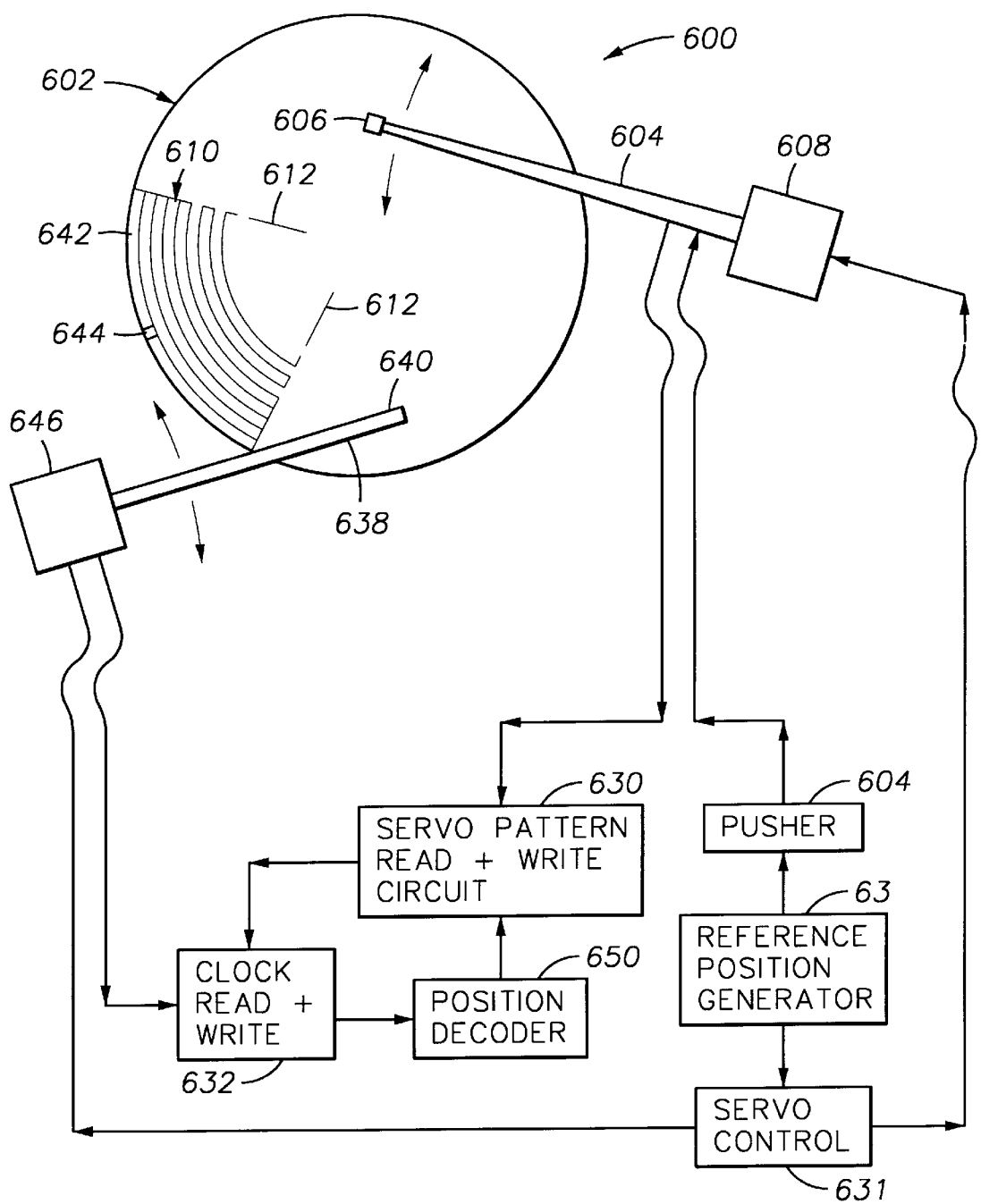
FIG. 13 is a schematic representation of a block diagram of a disk drive servo pattern writing system constructed in accordance with the present invention for recording the servo patterns illustrated in FIGS. 3 through 8.

Conventional disk drives do not contain servo patterns such as described above for FIGS. 3 through 9 and do not contain servo controllers that could properly decode and control servo position with it. It is common for servo pattern recording to be carried out by the same equipment used for data recording. If the same equipment is used, then a configuration such as illustrated in FIG. 11 could be used, with the addition of pattern generating circuitry. FIG. 13 shows a preferred embodiment of a disk servo pattern recording system 600 constructed in accordance with the present invention, in which dedicated servo recording equipment is used. The servo recording system 600 is for recording a servo pattern on a disk 602 in accordance with a sector servo system, but it should be understood that the teachings of the present invention apply equally well to dedicated servo systems and other storage systems using servo-controlled heads, such as capacitive and magneto-optical disk storage systems.

The pattern recording system of FIG. 13 includes an actuator arm 604 with a read/write head 606. The servo arm 604 is moved across the disk by the combination of an arm servo 608 and a pusher 609. Together, the arm servo and the pusher pivot the actuator 604, thereby changing the position of the servo write head 606 with respect to concentric tracks 610 of data contained on the disk 602. Although rotary movement of the actuator 604 is depicted for illustrative purposes, the pattern recording system 600 may alternatively use another positioning scheme, such as linear extension/retraction of the actuator 604.

One of the servo patterns described above is recorded into tracks across the disk 602. In FIG. 13, the disk is divided into sectors that are represented by radial lines 612. As noted above in connection with FIG. 10, each sector includes a servo information field 328 followed by a customer data identification field 334 and a customer data field 336.

The servo pattern recording system 600 operates under the control of a servo pattern read and write circuit 630 and a servo control module 631. The read and write circuit 630 includes a generator that produces servo pattern signals that cause magnetic transitions comprising servo patterns, such as illustrated in a selected one of the FIGS. 3 through 9, to be recorded on the disk 602 and also generates timing clock signals that are recorded and read back during the servo writing process. The recording of the servo pattern signal is performed by the servo write head 606. The pattern signal causes the write head 606 to be intermittently energized, which thereby generates the magnetic transitions that are recorded into the servo tracks 610. The timing clock signals are provided to a clock read/write circuit 632, as described further below.

The pusher 609 determines the radial position of the arm 604 using a position signal generated by a reference position generator 636 and controls the rotary position of the arm to properly record the servo pattern. The servo arm 604 is moved across the disk 602 by the pusher arm with a combined force produced by the arm servo 608 in response to a signal from the servo control module 631.

The servo pattern recording system 600 includes a separate servo clock arm 638 having a clock read/write head 640 that records a clock timing signal into a clock track 642 (represented in FIG. 13 by two parallel lines at the outer diameter) of the disk 602. The system also records an index mark 644 at a single location of the clock track, and uses the index mark in recording the servo pattern. The index mark is placed at a predetermined location with respect to the servo sectors 612 and to the servo information fields of the disk 602. The clock timing signal and the index mark are recorded in accordance with a clock timing signal and index signal generated by the servo pattern read and write circuit 630. If desired, such information can be used to supplement the track type determination made by the servo controller to unambiguously identify the read/write head 406 (FIG. 11) track position during subsequent servo control operation.

A clock head servo 646 moves the servo clock arm 638 during the recording of the clock track in response to signals received from the servo control module 631. During the initial recording of the timing track, the clock and index timing signals are received from the read and write circuit 630. The clock head 640 transduces the timing signal recorded in the clock track 642 and generates a clock readback signal that is processed by the clock read and write circuit 630. The index mark and clock signal are generated by a rotational position decoder 650 that provides the rotary position signals and that generates a rotary position count and provides it to the pattern generator of the read and write circuit 630. The position count signal is a count of the clock signal read back from the clock track 642 and is used by the pattern generator to generate appropriate signals and delay during servo track writing.

ADVANTAGES OF THE INVENTION

Thus, position error sensing in accordance with the present invention is performed without gray code information based on determining track type from comparison of servo pattern information. This provides unambiguous track identification while freeing up additional disk surface area for customer data that otherwise would be taken up by the gray code information. Upwards of ten thousand track types can be identified with recording of appropriate double multiple-frequency, dual-burst servo patterns and proper PES demodulation.

The present invention has been described above in terms of presently preferred embodiments so that an understanding of the present invention can be conveyed. There are, however, many configurations for disk storage systems and servo control systems not specifically described herein but with which the present invention is applicable. The present invention should therefore not be seen as limited to the particular embodiments described herein, but rather, it should be understood that the present invention has wide applicability with respect to disk storage systems and servo control systems generally. All modifications, variations, or equivalent arrangements that are within the scope of the attached claims should therefore be considered to be within the scope of the invention.

I claim:

1. A disk drive having:
    a magnetic storage media disk on which is recorded tracks of servo pattern bursts comprising a sequence of magnetic transitions having a frequency, the bursts defining a multiple frequency servo pattern;

a magnetic head that transduces the servo pattern bursts and produces a readback signal;

a servo demodulator that receives the readback signal, recognizes the servo pattern burst data, determines a number of track types indicated by the readback signal to produce a track identification number from the number of track types, and produces a position error sensing (PES) signal therefrom; and a servo that moves the magnetic head relative to the surface of the magnetic storage media disk in response to the PES signal.

2. A disk drive as defined in claim 1, wherein the servo demodulator produces the PES signal in accordance with the determined track type.

3. A disk drive as defined in claim 2, wherein the servo demodulator further uses a timing mark to determine the track type and produce the PES signal.

4. A disk drive as defined in claim 1, wherein the servo pattern is comprised of transitions recorded in at least two transition-to-transition frequencies.

5. A disk drive as defined in claim 4, wherein the servo pattern comprises a quad burst servo pattern.

6. A disk drive as defined in claim 4, wherein the servo pattern comprises a dual burst servo pattern.

7. A disk drive as defined in claim 6, wherein the servo pattern comprises a two-frequency dual burst servo pattern having servo bursts A and B recorded at a first frequency and servo bursts C and D recorded at a second frequency different from the first, wherein the servo bursts A and B are spaced radially apart from each other on the disk and servo bursts C and D are spaced radially apart from each other on the disk.

8. A disk drive as defined in claim 7, wherein the servo bursts A and C are located in a first radial alignment and the servo bursts B and D are located in a second radial alignment.

9. A disk drive as defined in claim 6, wherein the servo pattern comprises a three-frequency, dual burst servo pattern having servo bursts A and B recorded at a first frequency, servo bursts C and D recorded at a second frequency different from the first, and servo bursts E and F recorded at a third frequency different from the first and different from the second, wherein the servo bursts A and B are spaced radially apart from each other on the disk, servo bursts C and D are spaced radially apart from each other on the disk, and servo bursts E and F are spaced radially apart from each other on the disk.

10. A disk drive as defined in claim 9, wherein the servo bursts A, C, and E are located in a first radial alignment and the servo bursts B, D, and F are located in a second radial alignment.

11. A disk drive as defined in claim 10, wherein the servo bursts in the first radial alignment are arranged in a repeating pattern defined by A, C, E, and the servo bursts in the second radial alignment are arranged in a repeating pattern defined by B, D, F, the servo bursts in the second radial alignment being offset from those in the first radial alignment by approximately one-half servo burst width.

12. A disk drive as defined in claim 10, wherein the servo bursts in the first radial alignment are arranged in a repeating pattern defined by A, C, A, E, and the servo bursts in the second radial alignment are arranged in a repeating pattern defined by B, D, B, F, the servo bursts in the second radial alignment being offset from those in the first radial alignment by approximately one-half a servo burst track width.

13. A disk drive as defined in claim 10, wherein the servo bursts in the first radial alignment are arranged in a repeating pattern defined by A, C, A, E, C, E and the servo bursts in the second radial alignment are arranged in a repeating pattern defined by B, D, B, F, D, F, the servo bursts in the second radial alignment being offset from those in the first radial alignment by approximately one-half a servo burst track width.

14. A disk drive as defined in claim 10, wherein the servo bursts in the first radial alignment are arranged in a repeating pattern defined by A, C, A, C, E, C, E, A, E, and the servo bursts in the second radial alignment are arranged in a repeating pattern defined by B, D, F, B, D, F, B, D, F, the servo bursts in the second radial alignment being offset from those in the first radial alignment by approximately one-half a servo burst track width.

15. A disk drive as defined in claim 6, wherein the servo pattern comprises:

a first three-frequency, dual burst servo pattern having servo bursts A and B recorded at a first frequency, servo bursts C and D recorded at a second frequency different from the first, and servo bursts E and F recorded at a third frequency different from the first and different from the second, wherein the servo bursts A and B are spaced radially apart from each other on the disk, servo bursts C and D are spaced radially apart from each other on the disk, and servo bursts E and F are spaced radially apart from each other on the disk; and a second three-frequency, dual burst servo pattern having servo bursts A and B recorded at the first frequency, servo bursts C and D recorded at the second frequency, and servo bursts E and F recorded at the third frequency, wherein the servo bursts A and B of the second dual burst servo pattern are spaced radially apart from each other on the disk and radially apart from the bursts of the first dual burst servo pattern, the servo bursts C and D are spaced radially apart from each other on the disk and radially apart from the bursts of the first dual burst servo pattern, and the servo bursts E and F are spaced radially apart from each other on the disk and radially apart from the bursts of the first dual burst servo pattern.

16. A disk drive as defined in claim 6, wherein the servo pattern information includes a timing mark.

17. A servo control system for positioning a magnetic head adjacent a surface of a moving magnetic storage medium for reading a servo pattern recorded in multiple tracks on the storage medium surface, the system comprising:

a head assembly having at least one read head for reading the servo pattern on the storage medium in a transducing direction and generating a read head servo signal therefrom;

a servo demodulator that receives the servo signal and responds to a signal from a sequence of servo pattern bursts comprising a sequence of magnetic transitions defining a multiple frequency servo pattern, determines a number of track types defined by the servo signal to produce a track identification number from the number of track types, and produces a position error sensing (PES) signal therewith;

a servo assembly that is activated to position the head assembly relative to the storage medium; and a servo controller that controls the servo assembly in accordance with the position signal to maintain the magnetic head centered relative to the servo track width.

18. A servo control system as defined in claim 17, wherein the servo demodulator produces the PES signal in accordance with the determined track type.

19. A servo control system as defined in claim 18, wherein the servo demodulator further uses a timing mark to determine the track type and produce the PES signal.

20. A servo control system as defined in claim 17, wherein the servo pattern is comprised of transitions recorded in at least two transition-to-transition frequencies.

21. A servo control system as defined in claim 20, wherein the servo pattern comprises a dual burst servo pattern.

22. A servo control system as defined in claim 20, wherein the servo pattern comprises a quad burst servo pattern.

23. A servo control system as defined in claim 22, wherein the servo pattern comprises a two-frequency, dual burst servo pattern having servo bursts A and B recorded at a first frequency and servo bursts C and D recorded at a second frequency different from the first, wherein the servo bursts A and B are spaced radially apart from each other on the disk and servo bursts C and D are spaced radially apart from each other on the disk.

24. A servo control system as defined in claim 23, wherein the servo bursts A and C are located in a first radial alignment and the servo bursts B and D are located in a second radial alignment.

25. A servo control system as defined in claim 22, wherein the servo pattern comprises a three-frequency, dual burst servo pattern having servo bursts A and B recorded at a first frequency, servo bursts C and D recorded at a second frequency different from the first, and servo bursts E and F recorded at a third frequency different from the first and different from the second, wherein the servo bursts A and B are spaced radially apart from each other on the disk, servo bursts C and D are spaced radially apart from each other on the disk, and servo bursts E and F are spaced radially apart from each other on the disk.

26. A servo control system as defined in claim 25, wherein the servo bursts A, C, and E are located in a first radial alignment and the servo bursts B, D, and F are located in a second radial alignment.

27. A servo control system as defined in claim 26, wherein the servo bursts in the first radial alignment are arranged in a repeating pattern defined by A, C, E, and the servo bursts in the second radial alignment are arranged in a repeating pattern defined by B, D, F, the servo bursts in the second radial alignment being offset from those in the first radial alignment by approximately one-half a servo burst track width.

28. A servo control system as defined in claim 26, wherein the servo bursts in the first radial alignment are arranged in a repeating pattern defined by A, C, A, E, and the servo bursts in the second radial alignment are arranged in a repeating pattern defined by B, D, B, F, the servo bursts in the second radial alignment being offset from those in the first radial alignment by approximately one-half a servo burst track width.

29. A servo control system as defined in claim 26, wherein the servo bursts in the first radial alignment are arranged in a repeating pattern defined by A, C, A, E, C, E and the servo bursts in the second radial alignment are arranged in a repeating pattern defined by B, D, B, F, D, F, the servo bursts in the second radial alignment being offset from those in the first radial alignment by approximately one-half a servo burst track width.

30. A servo control system as defined in claim 26, wherein the servo bursts in the first radial alignment are arranged in a repeating pattern defined by A, C, A, C, E, C, E, A, E, and the servo bursts in the second radial alignment are arranged in a repeating pattern defined by B, D, F, B, D, F, B, D, F, the servo bursts in the second radial alignment being offset from those in the first radial alignment by approximately one-half a servo burst track width.

31. A servo control system as defined in claim 22, wherein the servo pattern comprises:

a first three-frequency, dual burst servo pattern having servo bursts A and B recorded at a first frequency, servo bursts C and D recorded at a second frequency different from the first, and servo bursts E and F recorded at a third frequency different from the first and different from the second, wherein the servo bursts A and B are spaced radially apart from each other on the disk, servo bursts C and D are spaced radially apart from each other on the disk, and servo bursts E and F are spaced radially apart from each other on the disk; and a second three-frequency, dual burst servo pattern having servo bursts A and B recorded at the first frequency, servo bursts C and D recorded at the second frequency, and servo bursts E and F recorded at the third frequency, wherein the servo bursts A and B of the second dual burst servo pattern are spaced radially apart from each other on the disk and radially apart from the bursts of the first dual burst servo pattern, the servo bursts C and D are spaced radially apart from each other on the disk and radially apart from the bursts of the first dual burst servo pattern, and the servo bursts E and F are spaced radially apart from each other on the disk and radially apart from the bursts of the first dual burst servo pattern.

32. A servo control system as defined in claim 22, wherein the servo pattern information includes a timing mark.

33. A servo demodulator that receives a read head servo signal generated by a read head located adjacent a surface of a moving magnetic storage medium and demodulates the servo signal to determine the position of the read head relative to a servo track of the storage medium, the servo demodulator including:

one or more frequency filters that receive the servo signal and produce a servo signal data according to the frequency of the corresponding servo burst pattern; and a logic circuit that responds to a signal from a sequence of servo pattern bursts comprising a sequence of magnetic transitions defining a multiple frequency servo pattern, determines a number of track types defined by the servo signal to produce a track identification number from the number of track types, and produces a position error sensing (PES) signal.

34. A servo demodulator as defined in claim 33, wherein the servo demodulator produces the PES signal in accordance with the determined track type.

35. A servo demodulator as defined in claim 34, wherein the servo demodulator further uses a timing mark to determine the track type and produce the PES signal.

36. A servo demodulator as defined in claim 33, wherein the servo pattern is comprised of transitions recorded in at least two transition-to-transition frequencies.

37. A servo demodulator as defined in claim 36, wherein the servo pattern comprises a dual burst servo pattern.

38. A servo demodulator as defined in claim 36, wherein the servo pattern comprises a quad burst servo pattern.

39. A servo demodulator as defined in claim 38, wherein the servo pattern comprises a two-frequency, dual burst servo pattern having servo bursts A and B recorded at a first frequency and servo bursts C and D recorded at a second frequency different from the first, wherein the servo bursts A and B are spaced radially apart from each other on the disk and servo bursts C and D are spaced radially apart from each other on the disk.

40. A servo demodulator as defined in claim 39, wherein the servo bursts A and C are located in a first radial alignment and the servo bursts B and D are located in a second radial alignment.

41. A servo demodulator as defined in claim 38, wherein the servo pattern comprises a three-frequency, dual burst servo pattern having servo bursts A and B recorded at a first frequency, servo bursts C and D recorded at a second frequency different from the first, and servo bursts E and F recorded at a third frequency different from the first and different from the second, wherein the servo bursts A and B are spaced radially apart from each other on the disk, servo bursts C and D are spaced radially apart from each other on the disk, and servo bursts E and F are spaced radially apart from each other on the disk.

42. A servo demodulator as defined in claim 41, wherein the servo bursts A, C, and E are located in a first radial alignment and the servo bursts B, D, and F are located in a second radial alignment.

43. A servo demodulator as defined in claim 42, wherein the servo bursts in the first radial alignment are arranged in a repeating pattern defined by A, C, E, and the servo bursts in the second radial alignment are arranged in a repeating pattern defined by B, D, F, the servo bursts in the second radial alignment being offset from those in the first radial alignment by approximately one-half a servo burst track width.

44. A servo demodulator as defined in claim 42, wherein the servo bursts in the first radial alignment are arranged in a repeating pattern defined by A, C, A, E, and the servo bursts in the second radial alignment are arranged in a repeating pattern defined by B, D, B, F, the servo bursts in the second radial alignment being offset from those in the first radial alignment by approximately one-half a servo burst track width.

45. A servo demodulator as defined in claim 42, wherein the servo bursts in the first radial alignment are arranged in a repeating pattern defined by A, C, A, E, C, E and the servo bursts in the second radial alignment are arranged in a repeating pattern defined by B, D, B, F, D, F, the servo bursts in the second radial alignment being offset from those in the first radial alignment by approximately one-half a servo burst track width.

46. A servo demodulator as defined in claim 42, wherein the servo bursts in the first radial alignment are arranged in a repeating pattern defined by A, C, A, C, E, C, E, A, E, and the servo bursts in the second radial alignment are arranged in a repeating pattern defined by B, D, F, B, D, F, B, D, F, the servo bursts in the second radial alignment being offset from those in the first radial alignment by approximately one-half a servo burst track width.

47. A servo demodulator as defined in claim 38, wherein the servo pattern comprises:
  a first three-frequency, dual burst servo pattern having servo bursts A and B recorded at a first frequency, servo bursts C and D recorded at a second frequency different from the first, and servo bursts E and F recorded at a third frequency different from the first and different from the second, wherein the servo bursts A and B are spaced radially apart from each other on the disk, servo bursts C and D are spaced radially apart from each other on the disk, and servo bursts E and F are spaced radially apart from each other on the disk; and
  a second three-frequency, dual burst servo pattern having servo bursts A and B recorded at the first frequency, servo bursts C and D recorded at the second frequency, and servo bursts E and F recorded at the third frequency, wherein the servo bursts A and B of the second dual burst servo pattern are spaced radially apart from each other on the disk and radially apart from the bursts of the first dual burst servo pattern, the servo bursts C and D are spaced radially apart from each other on the disk and radially apart from the bursts of the first dual burst servo pattern, and the servo bursts E and F are spaced radially apart from each other on the disk and radially apart from the bursts of the first quad burst servo pattern.

48. A servo demodulator as defined in claim 38, wherein the servo pattern information includes a timing mark.

49. A method of processing a readback signal and producing a position error sensing (PES) signal for controlling movement of a magnetic head relative to tracks of servo pattern bursts on a magnetic media storage disk, the servo pattern bursts comprising a sequence of magnetic transitions defining a multiple frequency servo pattern; the method comprising the steps of:
  receiving the readback signal;
  determining a number of track types indicated by the readback signal and producing a track identification number; and
  producing the PES signal.

50. A method as defined in claim 49, wherein the step of determining and producing comprises recognizing a timing mark to determine the track type and produce the PES signal.

51. A method as defined in claim 50, wherein the step of determining the number of track types comprises recognizing in the readback signal a servo pattern that comprises a two-frequency, dual burst servo pattern having servo bursts A and B recorded at a first frequency and servo bursts C and D recorded at a second frequency different from the first, wherein the servo bursts A and B are spaced radially apart from each other on the disk and servo bursts C and D are spaced radially apart from each other on the disk.

52. A method as defined in claim 51, wherein the servo bursts A and C are located in a first radial alignment and the servo bursts B and D are located in a second radial alignment.

53. A method as defined in claim 50, wherein the step of determining the number of track types comprises recognizing in the readback signal a servo pattern that comprises a three-frequency, dual burst servo pattern having servo bursts A and B recorded at a first frequency, servo bursts C and D recorded at a second frequency different from the first, and servo bursts E and F recorded at a third frequency different from the first and different from the second, wherein the servo bursts A and B are spaced radially apart from each other on the disk, servo bursts C and D are spaced radially apart from each other on the disk, and servo bursts E and F are spaced radially apart from each other on the disk.

54. A method as defined in claim 53, wherein the servo bursts A, C, and E are located in a first radial alignment and the servo bursts B, D, and F are located in a second radial alignment.

55. A method as defined in claim 54, wherein the servo bursts in the first radial alignment are arranged in a repeating pattern defined by A, C, E, and the servo bursts in the second radial alignment are arranged in a repeating pattern defined by B, D, F, the servo bursts in the second radial alignment being offset from those in the first radial alignment by approximately one-half a servo burst track width.

56. A method as defined in claim 54, wherein the servo bursts in the first radial alignment are arranged in a repeating pattern defined by A, C, A, E, and the servo bursts in the second radial alignment are arranged in a repeating pattern defined by B, D, B, F, the servo bursts in the second radial alignment being offset from those in the first radial alignment by approximately one-half a servo burst track width.

57. A method as defined in claim 54, wherein the servo bursts in the first radial alignment are arranged in a repeating pattern defined by A, C, A, E, C, E and the servo bursts in the second radial alignment are arranged in a repeating pattern defined by B, D, B, F, D, F, the servo bursts in the second radial alignment being offset from those in the first radial alignment by approximately one-half a servo burst track width.

58. A method as defined in claim 54, wherein the servo bursts in the first radial alignment are arranged in a repeating pattern defined by A, C, A, C, E, C, E, A, E, and the servo bursts in the second radial alignment are arranged in a repeating pattern defined by B, D, F, B, D, F, B, D, F, the servo bursts in the second radial alignment being offset from those in the first radial alignment by approximately one-fourth a servo burst track width.

59. A method as defined in claim 50, wherein the step of determining the number of track types comprises recognizing in the readback signal a servo pattern that comprises:

a first three-frequency, dual burst servo pattern having servo bursts A and B recorded at a first frequency, servo bursts C and D recorded at a second frequency different from the first, and servo bursts E and F recorded at a third frequency different from the first and different from the second, wherein the servo bursts A and B are spaced radially apart from each other on the disk, servo bursts C and D are spaced radially apart from each other on the disk, and servo bursts E and F are spaced radially apart from each other on the disk; and a second three-frequency, dual burst servo pattern having servo bursts A and B recorded at the first frequency, servo bursts C and D recorded at the second frequency, and servo bursts E and F recorded at the third frequency, wherein the servo bursts A and B of the second dual burst servo pattern are spaced radially apart from each other on the disk and radially apart from the bursts of the first dual burst servo pattern, the servo bursts C and D are spaced radially apart from each other on the disk and radially apart from the bursts of the first dual burst servo pattern, and the servo bursts E and F are spaced radially apart from each other on the disk and radially apart from the bursts of the first dual burst servo pattern.

60. A method as defined in claim 50, wherein the servo pattern information includes a timing mark.

61. A servo pattern recording apparatus that records a servo pattern on a magnetic storage medium, the apparatus comprising:

a write head that generates magnetic flux for producing a servo pattern comprising a cyclic sequence of magnetic flux transitions recorded in servo tracks on the storage medium along a transducing direction that extend across the width of the servo tracks and define servo pattern stripes;

a pattern generator that intermittently energizes the write head with a predetermined polarity to automatically record the magnetic flux transitions such that a read head signal produced by a servo pattern transducing read head varies as the read head is moved across the width of a servo track, the stripes defining a multiple frequency servo pattern such that the read head signal defines a number of track types that provide a track identification number;

a servo driver that moves a servo write arm, to which the servo head is attached across a storage medium; and a pusher that cooperates with the servo driver and moves the servo write arm across the storage medium.

* * * * *

UNITED STATES PATENT AND TRADEMARK OFFICE
CERTIFICATE OF CORRECTION

PATENT NO. : 6,034,835
DATED : March 7, 2000
INVENTOR(S) : Serrano

It is certified that error appears in the above-indentified patent and that said Letters Patent is hereby corrected as shown below:

Title page,
Add item [56]  References Cited
U.S. PATENT DOCUMENTS 5,408,373    04/18/95    Bajorek et al    360/104

Signed and Sealed this

Twenty-seventh Day of February, 2001

Attest:

NICHOLAS P. GODICI

Attesting Officer    Acting Director of the United States Patent and Trademark Office